US012342155B2

(12) United States Patent
Sambhwani et al.

(10) Patent No.: US 12,342,155 B2
(45) Date of Patent: Jun. 24, 2025

(54) RADIO FREQUENCY SENSING FOR CONTROL OF A MEDIA SYSTEM

(71) Applicant: QUALCOMM Incorporated, San Diego, CA (US)

(72) Inventors: Sharad Sambhwani, San Diego, CA (US); Ferdinando Olivieri, Carlsbad, CA (US); Menucher Menuchehry, Carlsbad, CA (US); Ariel Yaakov Sagi, Haifa (IL); Evyatar Hemo, Kiryat Bialik (IL)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 17/795,182

(22) PCT Filed: Feb. 4, 2021

(86) PCT No.: PCT/US2021/070124
§ 371 (c)(1),
(2) Date: Jul. 25, 2022

(87) PCT Pub. No.: WO2021/195650
PCT Pub. Date: Sep. 30, 2021

(65) Prior Publication Data
US 2023/0079716 A1    Mar. 16, 2023

(30) Foreign Application Priority Data

Mar. 22, 2020   (IL) .......................................... 273499

(51) Int. Cl.
*H04S 7/00*        (2006.01)
(52) U.S. Cl.
CPC .......... *H04S 7/303* (2013.01); *H04S 2400/13* (2013.01)

(58) Field of Classification Search
CPC .............................. H04S 7/303; H04S 2400/13
USPC ........................................................ 381/303
See application file for complete search history.

(56) References Cited

U.S. PATENT DOCUMENTS

| | | | |
|---|---|---|---|
| 2018/0152783 A1* | 5/2018 | Barmoav | H04R 1/323 |
| 2018/0176679 A1* | 6/2018 | Lu | H04R 3/005 |
| 2019/0206423 A1* | 7/2019 | Winton | G10L 21/0232 |
| 2020/0169809 A1* | 5/2020 | Boulanger | H04R 3/12 |
| 2020/0205726 A1* | 7/2020 | Lee | A61B 5/1126 |

FOREIGN PATENT DOCUMENTS

| | | |
|---|---|---|
| EP | 3508972 A1 | 7/2019 |
| WO | WO-2019122412 A1 | 6/2019 |

OTHER PUBLICATIONS

International Search Report and Written Opinion—PCT/US2021/070124—ISA/EPO—May 7, 2021.

* cited by examiner

*Primary Examiner* — Vivian C Chin
*Assistant Examiner* — Douglas J Suthers
(74) *Attorney, Agent, or Firm* — QUALCOMM Incorporated

(57) ABSTRACT

Various aspects of the present disclosure generally relate to media systems. In some aspects, a media device may monitor, using a radio frequency (RF) sensor, an environment of the media device; determine, from a received RF signal obtained by the RF sensor, a user attribute of a user within the environment; and control an audio system, associated with the media device, to direct an audio beam toward or away from the user. Numerous other aspects are provided.

30 Claims, 5 Drawing Sheets

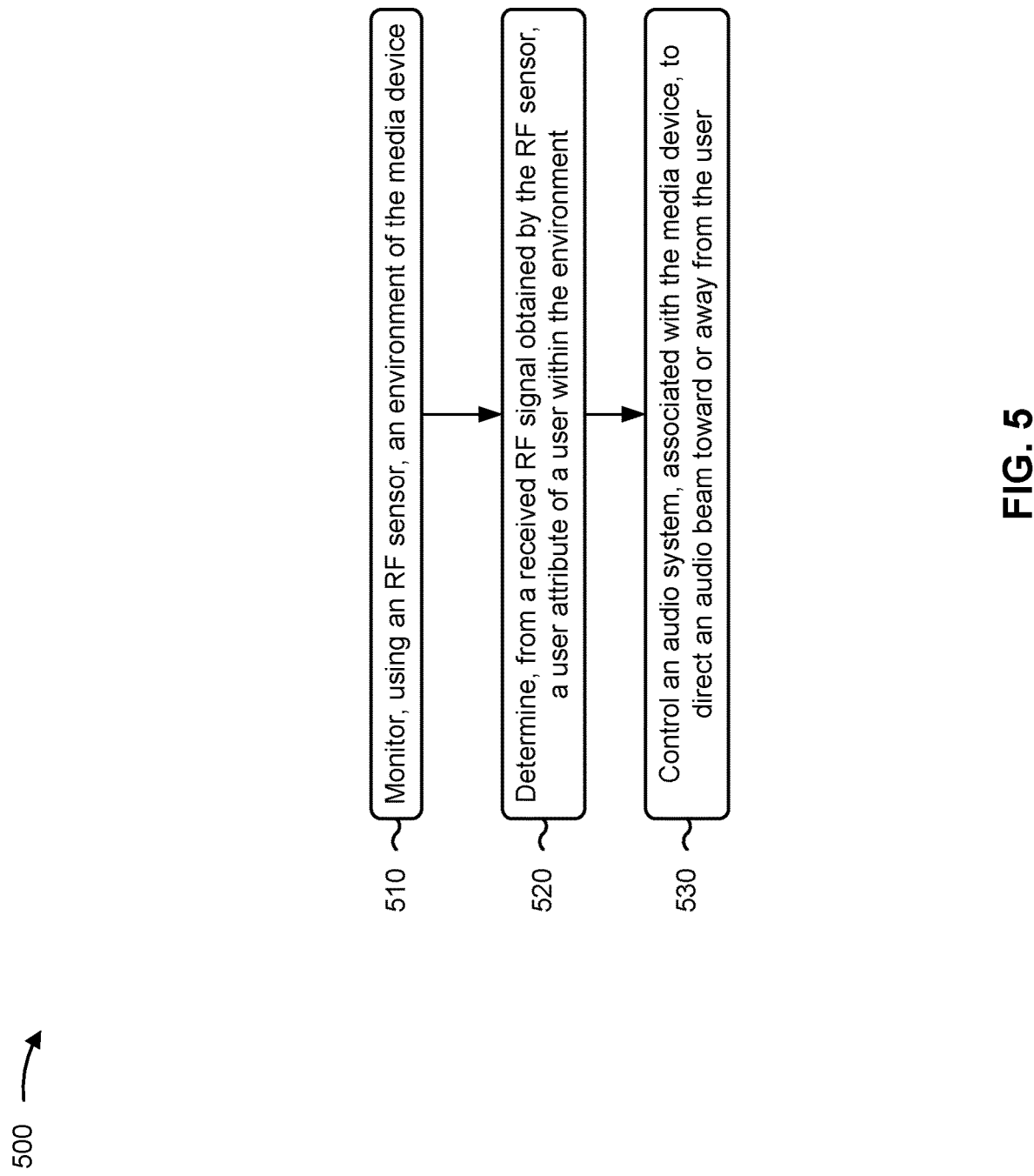

RADIO FREQUENCY SENSING FOR CONTROL OF A MEDIA SYSTEM

CROSS-REFERENCE TO RELATED APPLICATION APPLICATIONS

This Patent Application is a 371 national stage of PCT Application No. PCT/US2021/070124 filed on Feb. 4, 2021, entitled "RADIO FREQUENCY SENSING FOR CONTROL OF A MEDIA SYSTEM," which claims priority to Israel Patent Application No. 273499, filed on Mar. 22, 2020, entitled "RADIO FREQUENCY SENSING FOR CONTROL OF A MEDIA SYSTEM," and assigned to the assignee hereof. The disclosure of the prior Applications are considered part of and are incorporated by reference into this Patent Application.

FIELD OF THE DISCLOSURE

Aspects of the present disclosure generally relate to radio frequency (RF) sensing and to RF sensing for control of a media system.

BACKGROUND

Media systems, including audio/video systems, render (or output) content to permit one or more users to hear and/or view the content. A media system can include a display device (e.g., a television, a projector, and/or the like) to present video content and/or an audio device (e.g., one or more speakers) to emit audio content. In some cases, the media system can include a soundbar and/or a stereo configuration of multiple speakers. The media system can be controlled to render the content in various ways (e.g., according to various playback settings, various audio/video modes, various volume settings, and/or the like). Various forms of the content can also be available for rendering (e.g., audio can be emitted in different languages, video can be presented to include certain metadata, and/or the like).

SUMMARY

In some aspects, a method performed by a media device may include monitoring, using a radio frequency (RF) sensor, an environment of the media device; determining, from a received RF signal obtained by the RF sensor, a user attribute of a user within the environment; and controlling an audio system, associated with the media device, to direct an audio beam toward or away from the user.

In some aspects, a media device may include an RF sensor, a memory, and one or more processors operatively coupled to the memory. The memory and the one or more processors may be configured to monitor, using the RF sensor, an environment of the media device; determine, from a received RF signal obtained by the RF sensor, a user attribute of a user within the environment; and control an audio system, associated with the media device, to direct an audio beam toward or away from the user.

In some aspects, a non-transitory computer-readable medium may store one or more instructions. The one or more instructions, when executed by one or more processors of a media device, may cause the one or more processors to monitor, using an RF sensor, an environment of the media device; determine, from a received RF signal obtained by the RF sensor, a user attribute of a user within the environment; and control an audio system, associated with the media device, to direct an audio beam toward or away from the user.

In some aspects, an apparatus for wireless communication may include means for monitoring, using an RF sensor, an environment of a media device; means for determining, from a received RF signal obtained by the RF sensor, a user attribute of a user within the environment; and means for controlling an audio system, associated with the media device, to direct an audio beam toward or away from the user.

Aspects generally include a method, apparatus, system, computer program product, non-transitory computer-readable medium, user device, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a flowchart of one or more example processes associated with RF sensing for control of a media system.

DETAILED DESCRIPTION

Figure 1:
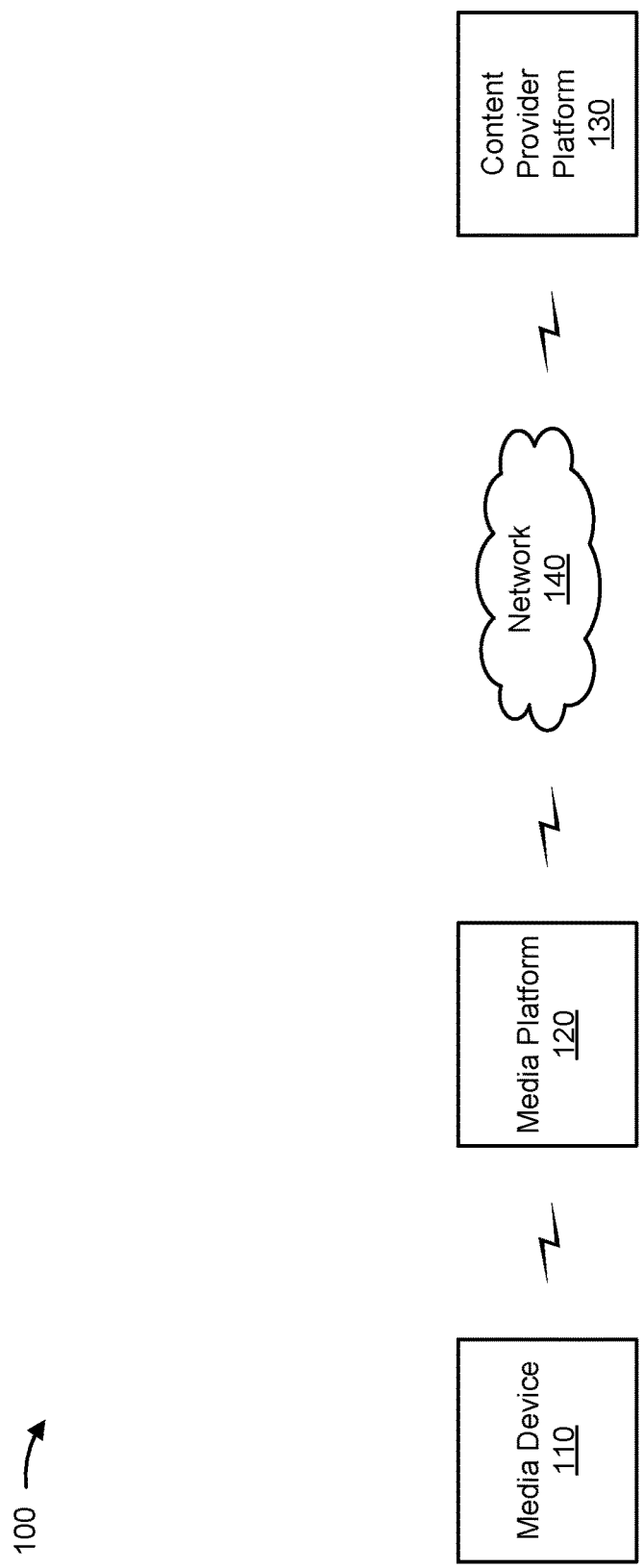
FIG. 1 is a diagram illustrating an example environment in which methods and systems described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some instances, an environment of a media system can be monitored to detect and/or track one or more users within the environment. For example, the one or more users may be detected and/or tracked to control a media system that includes a display device (e.g., a television, a projector, and/or the like), an audio system (e.g., a stereo, a soundbar, and/or the like), and/or the like. In such cases, the media system may be controlled based at least in part on detecting the user, based at least in part on a location of the user, and/or the like. According to previous techniques, the environment can be monitored using a camera to identify and/or analyze user behavior within the environment (e.g., while the user is viewing and/or listening to media). However, a camera is susceptible to security breaches that can compromise the privacy of the one or more users. For example, a hacker may access the camera to fraudulently obtain images of the one or more users, fraudulently detect and/or record activity of the one or more users, fraudulently detect or obtain images of content associated with the media system and/or being viewed or heard by the one or more users, and/or the like.

According to some aspects described herein, a media device uses radio frequency (RF) sensing to control a media system. In some aspects, the media device may monitor an environment of the media device using an RF sensor, determine, from an RF signal of the RF sensor, a user attribute of a user within the environment (e.g., a location of the user, a condition of the user, and/or the like), and control the audio system, associated with the media device, to direct an audio beam toward or away from the user. In this way, the media device can maintain the privacy of the user by using RF signals to detect and/or monitor the user because RF signals, unlike images (or video) captured by a camera, do not include information or data that is representative of an identity or likeness of the user (e.g., a depiction of the user's facial features, a depiction of the user's activity, and/or the like).

Under certain conditions, the media device can more accurately monitor an environment of the media system using an RF sensor relative to previous techniques that utilize a camera, because the camera can be affected by lighting conditions of the environment, while the RF sensor is not susceptible to lighting conditions. Therefore, using the RF signals can improve accuracy with respect to monitoring the environment, as described herein, under certain lighting conditions (e.g., when low ambient lighting, a glare, and/or the like prevents the camera from being able to capture images that depict objects in the environment) without requiring a flash to improve the lighting, which would diminish a user experience associated with consuming content from the media system.

Moreover, processing RF signals, as described herein to monitor an environment and/or control a media system, uses relatively fewer computing resources (e.g., processor resources, memory resources, and/or the like) than correspondingly processing images to monitor the environment and/or control the media system. More specifically, RF signals used to monitor an environment and/or a user, as described herein, generally involve less data processing to determine a same type of information, relative to processing images of the environment and/or the user, which can require various image processing and/or computer vision techniques, each of which would consume relatively more computing resources than using the RF signals, as described herein.

FIG. 1 is a diagram of an example system 100 in which systems and/or methods described herein may be implemented. As shown in FIG. 1, system 100 includes a media device 110, a media platform 120, a content provider platform 130, and a network 140. Devices of system 100 may interconnect via wired connections, wireless connections, or a combination of wired and wireless connections.

Media device 110 includes one or more devices capable of receiving, generating, storing, processing, providing, and/or rendering (e.g., visibly, audibly, and/or the like) content to permit a user to access (e.g., view or hear) the content. For example, media device 110 may include a communication device and/or computing device, such as a television, a soundbar, a stereo receiver, a gaming device, and/or the like. Additionally, or alternatively, media device 110 may include a mobile device, such as a mobile phone, a laptop computer, a tablet computer, a handheld computer, or a similar type of device.

Media device 110 may be included within a media system (e.g., a system that includes one or more audio output components, video output components, and/or the like) that is in any suitable system that can be monitored, via an RF sensor, as described herein. For example, media device 110 may be included within a home environment (e.g., as a component of a home theater system), a mobile environment (e.g., as a component of a vehicle media or control console and/or audio system), a public environment (e.g., as a digital sign, an advertisement device, and/or the like).

Media platform 120 includes a device capable of receiving, transmitting, and/or processing content (e.g., multimedia content, such as video (or image) content, audio content, and/or the like) and providing the content to a user (e.g., via media device 110). Examples of media platform 120 may include a set-top box, a casting stick (e.g., a high-definition media interface (HDMI) dongle), a computer, a cable card, a gaming device, a portable electronic device, and/or other types of devices capable of receiving, transmitting, and/or processing content and providing the content to a user. In some aspects, media platform 120 may be included within media device 110 (e.g., similar to a smart television, as an application and/or within a browser of media device 110, and/or the like). Media platform 120 may receive the content from content provider platform 130 via network 140 and provide (e.g., forward) the content to media device 110 for rendering.

Content provider platform 130 may include one or more devices (e.g., server devices, network devices, and/or the like) capable of generating, processing, and/or providing content to media platform 120. For example, content provider platform 130 may include a multimedia platform that is configured to broadcast, multicast, and/or stream multimedia data associated with the content to media platform 120 and/or media device 110, to permit media device 110 to process the multimedia data to render the content.

Network 140 includes one or more wired and/or wireless networks. For example, network 140 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as one or more examples. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
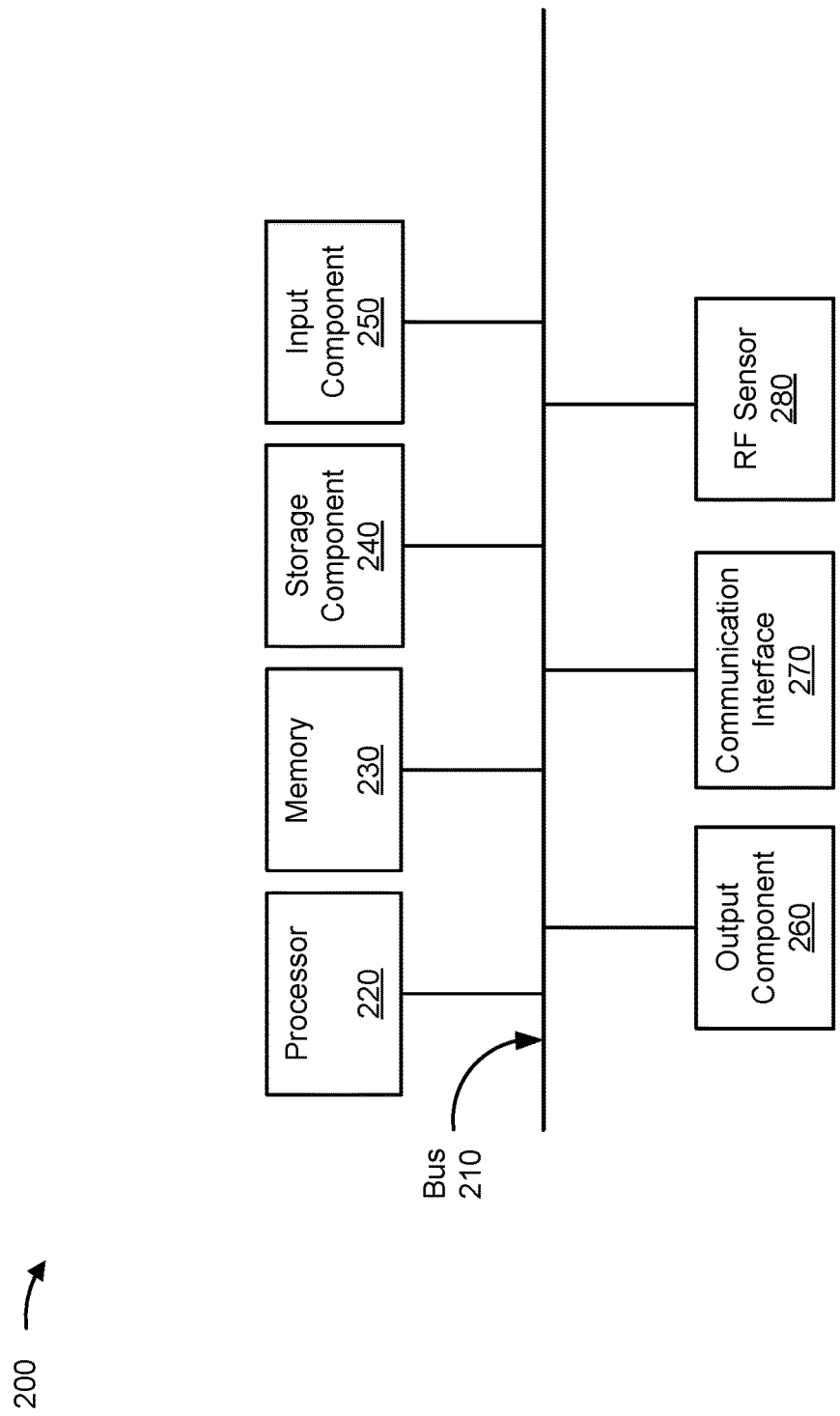
FIG. 2 is a diagram illustrating example components of one or more devices shown in FIG. 1, such as a media device, in accordance with various aspects of the present disclosure.

FIG. 2 is a diagram of example components of a device 200. Device 200 may correspond to media device 110, media platform 120, and/or content provider platform 130. In some aspects, media device 110, media platform 120, and/or content provider platform 130 may include one or more devices 200 and/or one or more components of device 200. As shown in FIG. 2, device 200 may include a bus 210, a processor 220, a memory 230, a storage component 240, an input component 250, an output component 260, a communication interface 270, and an RF sensor 280.

Bus 210 includes a component that permits communication among multiple components of device 200. Processor 220 is implemented in hardware, firmware, and/or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 250 includes a component that permits device 200 to receive information, such as via user input (e.g., a touch screen display, a keyboard, a keypad, a mouse, a button, a switch, and/or a microphone). Output component 260 includes a component that provides output information from device 200 (via, e.g., a display, a speaker, a haptic feedback component, an audio or visual indicator, and/or the like).

Communication interface 270 includes a transceiver-like component (e.g., a transceiver, a separate receiver, a separate transmitter, and/or the like) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, and/or the like.

RF sensor 280 includes one or more components that are capable of transmitting and/or receiving RF signals to monitor an environment, as described herein. RF sensor 280 may be a full duplex radio detection and ranging (RADAR) sensor that operates according to phase-coded pulse compression. For example, a phase of each sub-pulse of an RF signal can be selected in accordance with a complementary sequence (e.g., a Golay sequence). In this way, a channel impulse response (CIR) estimate can be determined based at least in part on a correlation between a pulse (e.g., a transmitted RF signal) and a corresponding echo (e.g., a received RF signal corresponding to the transmitted RF signal being reflected off of one or more objects in the environment). RF sensor 280 may operate with a certain channel bandwidth that provides a desired range resolution. For example, RF sensor 280 may operate with a 3.52 gigahertz (GHz) channel bandwidth to achieve a range resolution of approximately 4.26 centimeters (cm).

RF sensor 280 may include multiple antennas to permit an RF signal to be transmitted and/or received in association with analog beamforming and/or digital beamforming. For example, RF sensor 280 may include an array of transmit antennas and an array of receive antennas. The quantity of transmit antennas and/or quantity of receive antennas (and/or corresponding ratio) may be based at least in part on a desired formation of transmitting or receiving RF beams to monitor the environment (e.g., to detect a user, determine a location of the user, determine a condition of the user, and/or the like). For example, to monitor an environment of a home theater and permit detection of multiple users within the environment, the RF sensor 280 may include an array of 32 transmit antennas and an array of 32 receive antennas.

RF sensor 280 may be a millimeter wave (mmWave) sensor that is capable of operating within a designated radio spectrum. For example, RF sensor 280 may include a 60 GHz mmWave RADAR sensor that is capable of detecting a user, a location of the user, and/or a condition of the user based at least in part on phase variation identified and/or determined in the CIR of one or more RF signals. In this way, as described herein, a media device (e.g., media device 110) may be capable of detecting one or more biometrics of a user within the environment, such as a heart rate, a breathing rate, a movement signature (e.g., associated with a gait of the user, an emotion of the user, a sentiment of the user, and/or the like), and/or the like.

In some aspects, device 200 includes means for performing one or more processes described herein and/or means for performing one or more operations of the processes described herein. For example, the means for performing the processes and/or operations described herein may include bus 210, processor 220, memory 230, storage component 240, input component 250, output component 260, communication interface 270, RF sensor 280, and/or any combination thereof.

Device 200 may perform one or more processes described herein. Device 200 may perform these processes based at least in part on processor 220 executing software instructions stored by a non-transitory computer-readable medium, such as memory 230 and/or storage component 240. As used herein, the term "computer-readable medium" refers to a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardware circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
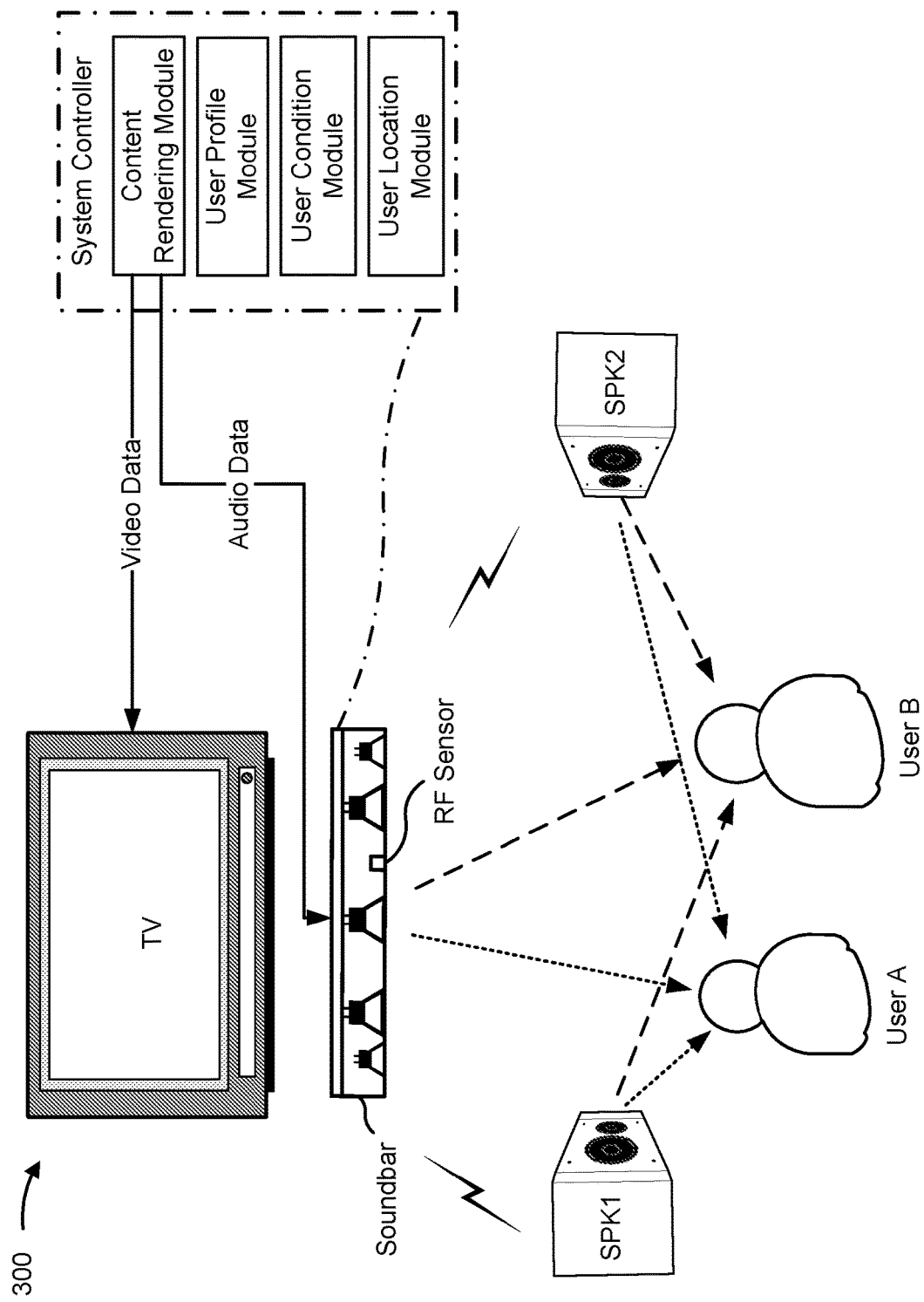
FIGS. 3 and 4 are diagrams illustrating examples associated with radio frequency (RF) sensing for control of a media system in accordance with various aspects of the present disclosure.

FIG. 3 is a diagram illustrating an example 300 associated with RF sensing for control of a media system in accordance with various aspects of the present disclosure. Example 300 includes a system controller of a media system that is within an environment. The system controller may be included within and/or associated with one or more of a plurality of media devices (e.g., corresponding to media device 110) of the media system. In example 300, the system controller is included within a soundbar, though the system controller may be included within one or more of a television (shown as "TV"), one or more of a plurality of speakers (shown as wireless speakers "SPK1" and "SPK2"), and/or any other similar type of media device in the media system.

In example 300, multiple users (shown as and referred to herein, individually, as "User A" and "User B," and collectively as "the users") may be viewing and/or listening to content that is displayed by the television and/or emitted by the soundbar and/or speakers. As shown, a first set of audio beams (shown as dotted lines) are configured, using audio beamforming, to direct audio content (e.g., music and/or audio of a movie, a program, a televised event, and/or the like) toward User A and a second set of audio beams (shown as dashed lines) are configured, using beamforming, to direct audio content toward user B. A set of audio beams may include one or more sound waves associated with the same audio content that are directionally focused toward a particular location (e.g., a determined location of the user) and correspondingly emitted from the soundbar and/or speakers to permit a user to hear the audio content with more clarity when the user is within the particular location and less clarity (or not at all) when the user is not within the particular location. According to some aspects described herein, the system controller may use RF signals associated with an RF sensor (e.g., RF sensor 280) of the soundbar to monitor the environment and/or the users, determine a user attribute of a user (e.g., a location of the user, a condition of the user, and/or the like) based at least in part on the RF signals, and control the media system according to the user attribute.

In example 300, the system controller includes a user location module, a user condition module, a user profile module, and a content rendering module. According to some aspects, the user location module is configured to detect the users and/or determine the locations of the users within the environment and/or relative to a location of the RF sensor (and/or soundbar). The user location module may be configured to detect a user based at least in part on detecting a change in the RF signals received from the RF sensor that indicate that an object and/or user is within the room. For example, the change may indicate the presence of the user at a location after previously determining that no user was at the location, based at least in part on a movement speed of the detected object (e.g., a movement speed that corresponds to a user speed), and/or the like. The change can be detected and/or monitored based at least in part on a Fast Fourier Transform (FFT) associated with the RF signals (e.g., a non-discrete FFT may indicate a user and a discrete FFT may correspond to a static object), a Doppler analysis (e.g., a Doppler FFT) associated with the RF signals, and/or the like.

Furthermore, based at least in part on signal information associated with receiving an RF signal via one or more of a plurality of antennas of the RF sensor, the user location module can perform a sensor beamforming analysis to determine a range between the user and the RF sensor, an azimuth associated with the user and the RF sensor, an elevation of the user relative to the RF sensor, and/or the like. For example, measurements associated with a received pattern of the RF signals via the antennas can provide information associated with the phase and/or amplitude of the antenna elements for azimuthal angles and/or elevation angles from the RF sensor.

According to some aspects, once the user, and correspondingly, the user location is identified, the user and, correspondingly, the user location of the user can be tracked by locking RF signals (e.g., by beamforming RF signals using the plurality of transmit antennas toward the user) onto the user to permit the user condition module to determine a condition of the user. According to some aspects, a filtering analysis (e.g., a Kalman filtering), a signal to noise ratio (SNR) analysis, a constant false-alarm rate (CFAR) analysis, and/or the like can be performed on the RF signals to track the user. Additionally, or alternatively, one or more of the analyses can be performed to iteratively and individually track multiple users within the environment.

The user condition module may be configured to determine a condition of the user based at least in part on one or more biometrics of the user determined from the RF signals of the RF sensor. For example, as described herein, RF signals may include mmWave signals that permit the RF sensor, and correspondingly, the system controller to detect a heart rate of the user, a breathing rate of the user, and/or other similar type of biometric.

The user profile module may be configured to determine and/or track (or store) information associated with the user. For example, the user profile module may include a data structure (e.g., a table, an index, a graph, and/or the like) with entries for individual users that are identified within the environment. According to some aspects, the user profile module may assign a user identifier to an identified user based at least in part on detecting the user, tracking a location of the user, and/or the like. Additionally, or alternatively, the user profile module may assign an identifier to an identified user that is based at least in part on one or more biometrics of the user. In this way, the user profile module may differentiate between User A and User B using the entries and update the entries to include information associated with User A and/or User B. Such information in the entries may include, for User A and/or User B, a corresponding location, heart rate, breathing rate, identified activity (e.g., associated with a most recently identified movement signature of the user), and/or determined condition (e.g., emotional condition and/or sentiment). In some aspects, based at least in part on values associated with the above, the system controller can determine a corresponding control action that is to be performed in association with the user profile information.

According to some aspects, the media device may be configured to provide feedback associated with the user condition and/or user activity to the content provider. For example, to measure a level of engagement and/or satisfaction with certain content, the media device may report user satisfaction information to a content provider platform (e.g., content provider platform) to permit the content provider platform to track and/or process the user satisfaction information (e.g., to learn and/or record user-specific content preferences).

In some aspects, the system controller may use and/or be associated with a machine learning model, such as an emotion detection model and/or sentiment analysis model, to determine an emotional condition of the user. For example, the machine learning model may be trained based at least in part on one or more emotional parameters associated with determining an emotional condition (and/or sentiment) of the user, such as a biometric of the user (e.g., a heart rate, a breathing rate, a movement signature, and/or the like), one or more characteristics of movement of the user (e.g., a speed at which the user is moving, an activity of the user, and/or the like), a position of the user (e.g., a distance from the user to the media device, whether an object has been moved between the user and the media device (to hide), and/or the like), and/or the like. The machine learning model may be trained using historical data associated with determining emotional conditions of users while viewing or listening to content of media systems (e.g., similar to the media system of example 300). Using the historical data and corresponding determined emotional parameters associated with the users in the environment (e.g., User A and User B) as inputs to the machine learning model, the system controller may determine the emotional conditions of the users to correspondingly permit respective control of audio beams providing content to the users.

To maintain privacy of the user associated with data that is stored and/or managed by the user profile manager, the system controller may ensure that the users opt in (e.g., via an authorization or user input to the media system) to enable the system controller to monitor the users in the environment to permit automated control of the media system. Accordingly, the system controller may be configured to abide by any and all applicable laws with respect to maintaining the privacy of the users and/or content associated with user activity during a media session. In some aspects, the system controller may anonymize and/or encrypt any obtained information (e.g., biometric information, movement information, and/or other information that may be considered private) associated with processing RF signals and/or generating the user profiles for detected users in the environment using the RF signals, as described herein. In some aspects, the system controller may have or be configured to have limited access to information associated with a user profile of a user. For example, the system controller may be configured to only have access to a user profile for a user for a threshold time period associated with the user viewing or listening to content via the media system. Additionally, or alternatively, the system controller may be configured to only generate and/or maintain (keep) a user profile during a single media session associated with a user (e.g., the user profile is erased when the media system is shut down). Moreover, the system controller may only have access to a limited type of information in the user profile (e.g., control preferences based at least in part on location only, not conditions or biometrics of the user).

In this way, according to the information maintained in the data structure of the user profile module, the user profile module may provide one or more control settings to the content rendering module for rendering the content. As described herein, the control settings may include and/or correspond to pausing playback of the content, increasing or decreasing volume of the audio, providing a particular audio stream associated with the content, and/or the like.

The content rendering module may be configured to provide video data to the television (e.g., to display video content) and/or audio data to the soundbar and wireless speakers (e.g., to emit audio content). According to some aspects, the audio data may include data associated with the first set of audio beams and the second set of audio beams to cause the soundbar and/or wireless speakers to correspondingly output audio accordingly. In this way, different configurations for the audio content that is to be rendered by the media system can be rendered for the individual users. For example, User A may receive a first audio stream that involves providing the content in a first language and User B may receive a second audio stream that involves providing the content in a second language. Additionally, or alternatively, the system controller can cause the first set of audio beams to provide relatively louder output at the user location of User A than the second set of audio beams are to provide to the user location of User B. Accordingly, the audio experience for User A can be different from the audio experience for User B.

As a rather specific example, if the system controller determines that User A and/or User B are not satisfied or are fearful of certain content being rendered by the media system, the system controller may stop or pause playback of the audio (e.g., to prevent User A and/or User B from continuing to be dissatisfied or fearful). As another example, if the system controller determines that User A is not satisfied or is fearful of the content being rendered while User B appears to be satisfied, the system controller may adjust audio beam A accordingly (e.g., reduce or mute the volume) without adjusting audio beam B (e.g., to permit User B to continue to enjoy the content).

In this way, as described herein, the system controller of a media device can control audio associated with certain audio beams for individual users of an environment of the media device to permit the users to have different user experiences associated with the content (and/or a user-specific user experience that is desired by the individual users).

As indicated above, FIG. 3 is provided merely as one or more examples. Other examples may differ from what is described with regard to FIG. 3.

Figure 4:
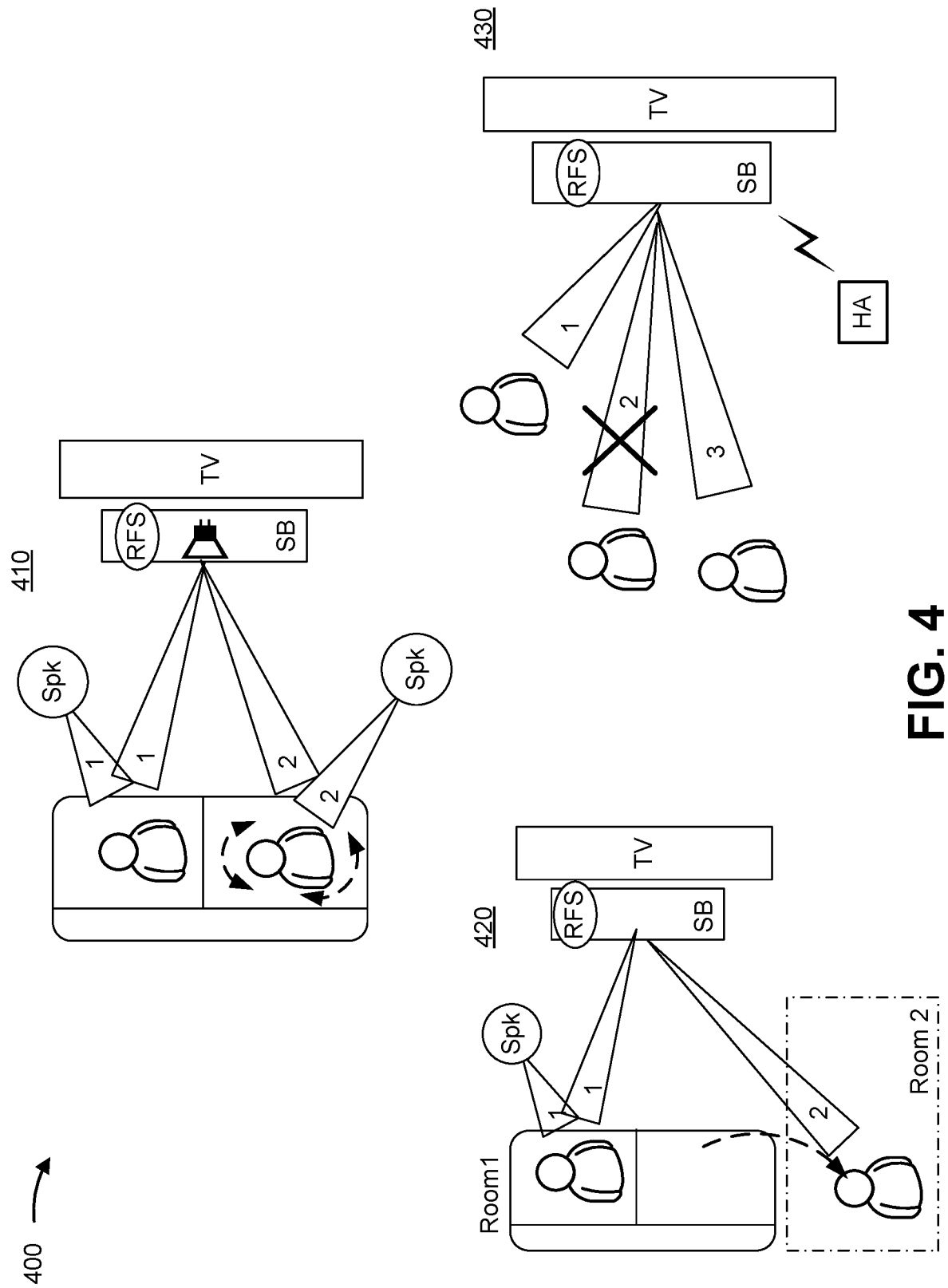

FIG. 4 is a diagram illustrating an example 400 associated with RF sensing for control of a media system in accordance with various aspects of the present disclosure. Example 400 includes one or more example scenarios associated with controlling a media system using RF sensing as described herein. In the example of FIG. 4, a plurality of users are within environments of media systems that include soundbars ("SB") with RF sensors ("RFS"). As described herein, the soundbars include system controllers (e.g., corresponding to the system controller of example 300) to control audio beam configurations based at least in part on one or more user attributes of a user detected within the environment.

In the example scenario identified by reference number 410, the system controller directs two sets of audio beams ("1" and "2") toward the users. The two sets of audio beams may have different configurations, as described herein. For example, the first audio beam ("1") may be at a first volume and the second audio beam ("2") may be at a second volume. As shown by the arrows, one of the users may be identified as moving in a particular manner that indicates that the user is uncomfortable, is scared, and/or is not satisfied with the content. In such a scenario, the system controller can mute the second audio beam without muting the first audio beam so that the moving user does not hear or detect audio content from the media system. Additionally, or alternatively, the first audio beam may be audio content that is emitted in a first language and the second audio beam may be audio content that is emitted in a second language (e.g., that is understandable to the moving user). In some aspects, the language of the audio beams can be selected according to a user input from the user (e.g., a voice input, or control input to the media system) and/or based on determining an identity of the user via the RF signals and an entry in a user profile for the user indicating that the user prefers a specific language.

In the example scenario identified by reference number 420, one of the users moves from a first room ("Room 1") to a second room ("Room 2"). As shown, the system controller, which is outputting two sets of audio beams ("1" and "2"), may be configured to track and/or follow the user from the first room into the second room and correspondingly adjust settings of the audio beam to maintain an audio configuration (e.g., a volume level) for the user. According to some aspects, the system controller may pause playback associated with the content because one of the users has left the room (and/or is outside of an audible range of the media system that corresponds to a preferred volume or set volume for the user). Additionally, or alternatively, the system controller may automatically resume playback when the user returns to the first room.

In the example scenario identified by reference number 430, the system controller includes and/or is communicatively coupled with a home assistant ("HA") (e.g., a voice control device) or other user input device. The system controller may be configured to output three audio beams ("1," "2," and "3") to three users. As indicated, a user that is receiving audio beam 2 may voice an input to mute audio beam 2 (e.g., to create a zone of silence around the user). In such a case, based on sensor beamforming analysis of the voice input to the home assistant, the system controller can determine which of the users requested that the audio be muted and correspondingly mute that audio beam for the user to create the zone of silence.

In this way, a system controller of a media device can be configured to control audio of the media device and/or a media system based on one or more determined attributes of one or more detected users within an environment of the media device.

As indicated above, FIG. 4 is provided merely as one or more examples. Other examples may differ from what is described with regard to FIG. 4.

FIG. 5 is a diagram illustrating an example process 500 performed, for example, by a media device, in accordance with various aspects of the present disclosure. Example process 500 is an example where the media device (e.g., media device 110 and/or the like) performs operations associated with radio frequency sensing for control of a media system.

As shown in FIG. 5, in some aspects, process 500 may include monitoring, using a radio frequency (RF) sensor, an environment of the media device (block 510). For example, the media device (e.g., using processor 220, memory 230, storage component 240, input component 250, output component 260, communication interface 270, RF sensor 280, and/or the like) may monitor, using an RF sensor, an environment of the media device, as described above.

As further shown in FIG. 5, in some aspects, process 500 may include determining, from a received RF signal obtained by the RF sensor, a user attribute of a user within the environment (block 520). For example, the media device (e.g., using processor 220, memory 230, storage component 240, input component 250, output component 260, communication interface 270, RF sensor 280, and/or the like) may determine, from a received RF signal obtained by the RF sensor, a user attribute of a user within the environment, as described above.

As further shown in FIG. 5, in some aspects, process 500 may include controlling an audio system, associated with the media device, to direct an audio beam toward or away from the user (block 530). For example, the media device (e.g., using processor 220, memory 230, storage component 240, input component 250, output component 260, communication interface 270, RF sensor 280, and/or the like) may control an audio system, associated with the media device, to direct an audio beam toward or away from the user, as described above.

Process 500 may include additional aspects, such as any single aspect or any combination of aspects described below and/or in connection with one or more other processes described elsewhere herein.

In a first aspect, the RF sensor is a multi-antenna RF sensor that includes a plurality of transmit antennas and a plurality of receive antennas. In a second aspect, alone or in combination with the first aspect, the user attribute comprises a user location that is determined based at least in part on performing a sensor beamforming analysis associated with receiving the RF signal via one or more of the plurality of receive antennas to determine at least one of: a range between the user and the RF sensor, or an azimuth associated with the user and the RF sensor.

In a third aspect, alone or in combination with one or more of the first and second aspects, the user attribute comprises a user location that is determined based at least in part on at least one of: a directional configuration of the RF sensor when receiving the RF signal, or a frequency difference between the received RF signal and a transmitted RF signal.

In a fourth aspect, alone or in combination with one or more of the first through third aspects, the user attribute comprises a biometric, the method further comprising: analyzing, based at least in part on processing the RF signal, the biometric of the user, and identifying, based at least in part on the biometric, a user profile associated with the user.

In a fifth aspect, alone or in combination with one or more of the first through fourth aspects, process 500 includes determining, from the user profile, an audio setting for providing the audio beam; and generating the audio beam based at least in part on the audio setting.

In a sixth aspect, alone or in combination with one or more of the first through fifth aspects, the audio setting comprises at least one of: a language setting, or a volume setting that is based at least in part on a distance between a speaker of the audio system and the user.

In a seventh aspect, alone or in combination with one or more of the first through sixth aspects, process 500 includes determining, based at least in part on the biometric, an emotional condition of the user; determining, from the user profile, an emotional playback setting associated with the media device rendering media according to the emotional condition; and controlling the audio system according to the emotional playback setting.

In an eighth aspect, alone or in combination with one or more of the first through seventh aspects, the emotional playback setting is determined according to a machine learning model that was trained on historical data associated with historical actions performed by the user while previously interacting with the media device or the audio system.

In a ninth aspect, alone or in combination with one or more of the first through eighth aspects, process 500 includes determining, based at least in part on the RF signal, a distance between a user location of the user and the RF sensor; determining from the user profile, a playback setting associated with the media device rendering media for the user at that distance; and controlling the audio system according to the playback setting.

In a tenth aspect, alone or in combination with one or more of the first through ninth aspects, process 500 includes receiving a voice input; determining a signature of the voice input; determining, based at least in part on the signature and a voice signature in the user profile, that the voice input is associated with the user; and controlling the audio system to provide the audio beam according to a command of the voice input.

In an eleventh aspect, alone or in combination with one or more of the first through tenth aspects, process 500 includes receiving a voice input; determining that the voice input is associated with the user; and controlling the audio system to provide the audio beam according to the voice input.

In a twelfth aspect, alone or in combination with one or more of the first through eleventh aspects, controlling the audio system may include audio beamforming, via one or more speakers of the audio system, the audio beam to provide the audio beam to a user location of the user.

In a thirteenth aspect, alone or in combination with one or more of the first through twelfth aspects, process 500 includes tracking, based at least in part on the user attribute, a user location as the user moves throughout the environment, and correspondingly controlling the audio system to direct the audio beam toward the user location as the user moves throughout the environment.

In a fourteenth aspect, alone or in combination with one or more of the first through thirteenth aspects, the user location is tracked based at least in part on applying a Doppler analysis to sensor beamforming data that is generated based at least in part on receiving the RF signal via one or more of a plurality of receive antennas of the RF sensor.

In a fifteenth aspect, alone or in combination with one or more of the first through fourteenth aspects, the media device comprises the audio system. In a sixteenth aspect, alone or in combination with one or more of the first through fifteenth aspects, the media device comprises at least one of: a display device, a content providing device, or a speaker. In a seventeenth aspect, alone or in combination with one or more of the first through sixteenth aspects, the RF sensor is contained within a same housing as at least one of: the media device, or a speaker of the audio system.

In an eighteenth aspect, alone or in combination with one or more of the first through seventeenth aspects, the RF sensor comprises a radio detection and ranging sensor using a 60 gigahertz millimeter wave. In a nineteenth aspect, alone or in combination with one or more of the first through eighteenth aspects, the media device and the audio system are collocated within a vehicle. In a twentieth aspect, alone or in combination with one or more of the first through nineteenth aspects, process 500 includes receiving a voice input from the user; and controlling, based at least in part on the voice input, the audio system to direct the audio beam away from the user location.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method performed by a media device, comprising: monitoring, using a radio frequency (RF) sensor, an environment of the media device; determining, from a received RF signal obtained by the RF sensor, a user attribute of a user within the environment; and controlling an audio system, associated with the media device, to direct an audio beam toward or away from the user.

Aspect 2: The method of Aspect 1, wherein the RF sensor is a multi-antenna RF sensor that includes a plurality of transmit antennas and a plurality of receive antennas.

Aspect 3: The method of Aspect 2, wherein the user attribute comprises a user location that is determined based at least in part on performing a sensor beamforming analysis associated with receiving the RF signal via one or more of the plurality of receive antennas to determine at least one of: a range between the user and the RF sensor, or an azimuth associated with the user and the RF sensor.

Aspect 4: The method of any of Aspects 1 to 3, wherein the user attribute comprises a user location that is determined based at least in part on at least one of: a directional configuration of the RF sensor when receiving the RF signal, or a frequency difference between the received RF signal and a transmitted RF signal.

Aspect 5: The method of any of Aspects 1 to 4, wherein the user attribute comprises a biometric, the method further comprising: analyzing, based at least in part on processing the RF signal, the biometric of the user; and identifying, based at least in part on the biometric, a user profile associated with the user.

Aspect 6: The method of Aspect 5, further comprising: determining, from the user profile, an audio setting for providing the audio beam; and generating the audio beam based at least in part on the audio setting.

Aspect 7: The method of Aspect 6, wherein the audio setting comprises at least one of: a language setting, or a volume setting that is based at least in part on a distance between a speaker of the audio system and the user.

Aspect 8: The method of any of Aspects 5 to 7, further comprising: determining, based at least in part on the biometric, an emotional condition of the user; determining, from the user profile, an emotional playback setting associated with the media device rendering media according to the emotional condition; and controlling the audio system according to the emotional playback setting.

Aspect 9: The method of Aspect 8, wherein the emotional playback setting is determined according to a machine learning model that was trained on historical data associated with historical actions performed by the user while previously interacting with the media device or the audio system.

Aspect 10: The method of any of Aspects 5 to 9, further comprising: determining, based at least in part on the RF signal, a distance between a user location of the user and the RF sensor; determining from the user profile, a playback setting associated with the media device rendering media for the user at that distance; and controlling the audio system according to the playback setting.

Aspect 11: The method of any of Aspects 5 to 10, further comprising: receiving a voice input; determining a signature of the voice input; determining, based at least in part on the signature and a voice signature in the user profile, that the voice input is associated with the user; and controlling the audio system to provide the audio beam according to a command of the voice input.

Aspect 12: The method of any of Aspects 1 to 11, further comprising: receiving a voice input; determining that the voice input is associated with the user; and controlling the audio system to provide the audio beam according to the voice input.

Aspect 13: The method of any of Aspects 1 to 12, wherein controlling the audio system comprises: audio beamforming, via one or more speakers of the audio system, the audio beam to provide the audio beam to a user location of the user.

Aspect 14: The method of any of Aspects 1 to 13, further comprising: tracking, based at least in part on the user attribute, a user location as the user moves throughout the environment, and correspondingly controlling the audio system to direct the audio beam toward the user location as the user moves throughout the environment.

Aspect 15: The method of Aspect 14, wherein the user location is tracked based at least in part on applying a Doppler analysis to sensor beamforming data that is generated based at least in part on receiving the RF signal via one or more of a plurality of receive antennas of the RF sensor.

Aspect 16: The method of any of Aspects 1 to 15, wherein the media device comprises the audio system.

Aspect 17: The method of any of Aspects 1 to 16, wherein the media device comprises at least one of: a display device, a content providing device, or a speaker.

Aspect 18: The method of any of Aspects 1 to 17, wherein the RF sensor is contained within a same housing as at least one of: the media device, or a speaker of the audio system.

Aspect 19: The method of any of Aspects 1 to 18, wherein the RF sensor comprises a radio detection and ranging sensor using a 60 gigahertz millimeter wave.

Aspect 20: The method of any of Aspects 1 to 19, wherein the media device and the audio system are collocated within a vehicle.

Aspect 21: The method of any of Aspects 1 to 20, further comprising: receiving a voice input from the user; and controlling, based at least in part on the voice input, the audio system to direct the audio beam away from the user.

Aspect 22: An apparatus for wireless communication at a device, comprising a processor; memory coupled with the processor; and instructions stored in the memory and executable by the processor to cause the apparatus to perform the method of one or more Aspects of Aspects 1-21.

Aspect 23: A device for wireless communication, comprising a memory and one or more processors coupled to the memory, the memory and the one or more processors configured to perform the method of one or more Aspects of Aspects 1-21.

Aspect 24: An apparatus for wireless communication, comprising at least one means for performing the method of one or more Aspects of Aspects 1-21.

Aspect 25: A non-transitory computer-readable medium storing code for wireless communication, the code comprising instructions executable by a processor to perform the method of one or more Aspects of Aspects 1-21.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 1-21.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based at least in part on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a media device, comprising:
monitoring, using a radio frequency (RF) sensor, an environment of the media device;
determining, from a received RF signal obtained by the RF sensor, a user location of a user within the environment based at least in part on a sensor beamforming analysis, wherein the user location is determined based at least in part on performing the sensor beamforming analysis to determine at least one of:
a range between the user and the RF sensor, or
an azimuth associated with the user and the RF sensor; and
controlling an audio system, associated with the media device, to direct an audio beam toward or away from the user.

2. The method of claim 1, wherein the user location is further determined based at least in part on at least one of:
a directional configuration of the RF sensor when receiving the RF signal, or
a frequency difference between the received RF signal and a transmitted RF signal.

3. The method of claim 1, further comprising:
determining, from the received RF signal, a biometric of the user; and
identifying, based at least in part on the biometric, a user profile associated with the user,
wherein controlling the audio system comprises:
controlling the audio system based at least in part on the user profile.

4. The method of claim 3, further comprising:
determining, from the user profile, an audio setting for providing the audio beam; and
generating the audio beam based at least in part on the audio setting.

5. The method of claim 4, wherein the audio setting comprises at least one of:
a language setting, or
a volume setting that is based at least in part on a distance between a speaker of the audio system and the user.

6. The method of claim 1, further comprising:
determining a distance between the user location and the RF sensor; and
determining a playback setting associated with rendering media for the user at the distance,
wherein controlling the audio system comprises:
controlling the audio system according to the playback setting.

7. The method of claim 1, further comprising:
receiving a voice input; and
determining that the voice input is associated with the user,
wherein controlling the audio system comprises:
controlling the audio system to provide the audio beam according to the voice input.

8. The method of claim 1, wherein controlling the audio system comprises:
audio beamforming, via one or more speakers of the audio system, the audio beam to provide the audio beam to the user location.

9. A media device, comprising:
a radio frequency (RF) sensor;
one or more memories; and
one or more processors, coupled to the one or more memories, configured to:
monitor, using the RF sensor, an environment of the media device;
determine, from a received RF signal obtained by the RF sensor, a user location of a user within the environment based at least in part on a sensor beamforming analysis, wherein the user location is determined based at least in part on performing the sensor beamforming analysis to determine at least one of:
a range between the user and the RF sensor, or
an azimuth associated with the user and the RF sensor; and
control an audio system, associated with the media device, to direct an audio beam toward or away from the user.

10. The media device of claim 9, wherein the RF sensor is a multi-antenna RF sensor that includes a plurality of transmit antennas and a plurality of receive antennas.

11. The media device of claim 9, wherein the user location is further determined based at least in part on at least one of:
a directional configuration of the RF sensor when receiving the RF signal, or
a frequency difference between the received RF signal and a transmitted RF signal.

12. The media device of claim 9, wherein the one or more processors are further configured to:
determine, from the received RF signal, a biometric of the user; and
identify, based at least in part on the biometric, a user profile associated with the user,
wherein the one or more processors, when controlling the audio system, are configured to:
control the audio system based at least in part on the user profile.

13. The media device of claim 12, wherein the one or more processors are further configured to:
determine, from the user profile, an audio setting for providing the audio beam; and
generate the audio beam based at least in part on the audio setting.

14. The media device of claim 9, wherein the one or more processors are further configured to:
determine a distance between the user location and the RF sensor; and
determine a playback setting associated with rendering media for the user at the distance,
wherein the one or more processors, when controlling the audio system, are further configured to:
control the audio system according to the playback setting.

15. The media device of claim 9, wherein the one or more processors are further configured to:
receive a voice input; and
determine that the voice input is associated with the user,
wherein the one or more processors, when controlling the audio system, are further configured to:
control the audio system to provide the audio beam according to the voice input.

16. The media device of claim 9, wherein the one or more processors, when controlling the audio system, are configured to:
audio beamform, via one or more speakers of the audio system, the audio beam to provide the audio beam to the user location.

17. A non-transitory computer-readable medium storing a set of instructions, the set of instructions comprising:
one or more instructions that, when executed by one or more processors of a media device, cause the media device to:
monitor, using a radio frequency (RF) sensor, an environment of the media device;
determine, from a received RF signal obtained by the RF sensor, a user location of a user within the environment based at least in part on a sensor beamforming analysis, wherein the user location is determined based at least in part on performing the sensor beamforming analysis to determine at least one of:
a range between the user and the RF sensor, or
an azimuth associated with the user and the RF sensor; and
control an audio system, associated with the media device, to direct an audio beam toward or away from the user.

18. The non-transitory computer-readable medium of claim 17, wherein the RF sensor is a multi-antenna RF sensor that includes a plurality of transmit antennas and a plurality of receive antennas.

19. The non-transitory computer-readable medium of claim 18, wherein the user location is further determined based at least in part on at least one of:
a directional configuration of the RF sensor when receiving the RF signal, or
a frequency difference between the received RF signal and a transmitted RF signal.

20. The non-transitory computer-readable medium of claim 17, wherein the one or more instructions further cause the media device to:
determine, from the received RF signal, a biometric of the user; and
identify, based at least in part on the biometric, a user profile associated with the user,
wherein the one or more instructions, that cause the media device to control the audio system, cause the media device to:
control the audio system based at least in part on the user profile.

21. The non-transitory computer-readable medium of claim 17, wherein the one or more instructions further cause the media device to:
determine a distance between the user location and the RF sensor;
determine a playback setting associated with rendering media for the user at the distance,
wherein the one or more instructions, that cause the media device to control the audio system, cause the media device to:
control the audio system according to the playback setting.

22. The non-transitory computer-readable medium of claim 17, wherein the one or more instructions, that cause the media device to control the audio system, cause the media device to:
audio beamform, via one or more speakers of the audio system, the audio beam to provide the audio beam to the user location.

23. An apparatus, comprising:
means for monitoring, using a radio frequency (RF) sensor, an environment of a media device;
means for determining, from a received RF signal obtained by the RF sensor, a user location of a user within the environment based at least in part on a sensor beamforming analysis, wherein the user location is determined based at least in part on performing the sensor beamforming analysis to determine at least one of:
a range between the user and the RF sensor, or
an azimuth associated with the user and the RF sensor; and
means for controlling an audio system, associated with the media device, to direct an audio beam toward or away from the user.

24. The apparatus of claim 23, further comprising:
means for determining, from the received RF signal, a biometric of the user; and
means for identifying, based at least in part on the biometric, a user profile associated with the user,
wherein the means for controlling the audio system comprises:
means for controlling the audio system based at least in part on the user profile.

25. The apparatus of claim 24, further comprising:
means for determining, from the user profile, an audio setting for providing the audio beam; and
means for generating the audio beam based at least in part on the audio setting.

26. The apparatus of claim 25, wherein the audio setting comprises at least one of:
a language setting, or
a volume setting that is based at least in part on a distance between a speaker of the audio system and the user.

27. The apparatus of claim 23, further comprising:
means for determining a distance between the user location and the RF sensor; and
means for determining a playback setting associated with rendering media for the user at the distance,
wherein the means for controlling the audio system comprises:
means for controlling the audio system according to the playback setting.

28. The apparatus of claim 23, further comprising:
means for receiving a voice input; and
means for determining that the voice input is associated with the user,
wherein the means for controlling the audio system comprises:
means for controlling the audio system to provide the audio beam according to the voice input.

29. The apparatus of claim 23, wherein the means for controlling the audio system comprises:
means for audio beamforming, via one or more speakers of the audio system, the audio beam to provide the audio beam to the user location.

30. The apparatus of claim 23, wherein the user location is further determined based at least in part on at least one of:
a directional configuration of the RF sensor when receiving the RF signal, or
a frequency difference between the received RF signal and a transmitted RF signal.

* * * * *